United States Patent Office 3,523,942
Patented Aug. 11, 1970

3,523,942
17-TERTIARY AMINO-SUBSTITUTED STEROID DERIVATIVES
Kenneth G. Holden, Stratford, N.J., assignor to Smith Kline & French Laboratories, Philadelphia, Pa., a corporation of Pennsylvania
No Drawing. Continuation-in-part of application Ser. No. 389,470, Sept. 13, 1964. This application Feb. 15, 1968, Ser. No. 705,629
Int. Cl. C07c 167/34, 171/06, 173/10
U.S. Cl. 260—239.5        8 Claims

ABSTRACT OF THE DISCLOSURE

New 17-tertiary aminomethyl testosterone derivatives having depressant activity. These compounds are prepared by reacting a 17,20-epoxy-3β-hydroxy-21-norpregn-5-ene with a tertiary amine, followed by oxidation at position 3.

---

This application is a continuation-in-part of Ser. No. 389,470 filed Sept. 13, 1964, now Pat. No. 3,375,280, issued Mar. 26, 1968.

This invention relates to new 17-tertiary aminomethyl-testosterone derivatives. While these derivatives have several pharmacodynamic activities at doses which do not demonstrate overt toxicity such as antiandrogenic, hypocholesterolemic and central nervous system depressant activity, their depressant activity is especially noteworthy as noted in more detail hereafter.

The compounds of this invention are illustrated by the following formula:

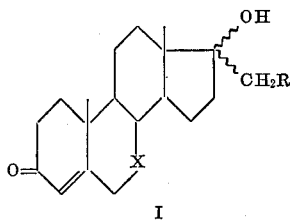

I in which X represents methylene (normal series) or preferably a single C—C bond (B-nor series); and R represents a N-tertiaryamino group having a maximum of 10 carbon atoms such as dialkylamino, piperidino, N-loweralkylpiperazino, morpholino, thiomorpholino or pyrrolidino. One skilled in the art will recognize the particular importance of the 17β-hydroxy-17α-substituted alkyl isomers and these are preferred. The compounds in the B-nor series are preferred because of their pronounced depressant or sedative activity.

These compounds are prepared by reacting either a specific isomer or mixture of isomers of 17,20-epoxy-3β-hydroxy-21-norpregn-5-ene (Pat. No. 3,300,489) with an excess of a tertiary amine usually in an inert organic solvent in which the reactants are substantially soluble such as methanol, ethanol or isopropanol at elevated temperatures. The latter reactant is preferably used in large excess. The reaction is most often carried out at the reflux temperature of the reaction mixture for from about 1–12 hours.

The resulting 17-substituted 3β,17-dihydroxyandrost-5-ene is then oxidized at position 3 most conveniently under Oppenauer conditions, for example, using cyclohexanone and aluminum isopropoxide. The desired product of Formula I is isolated by standard procedures with purification by fractional crystallization or preferably chromatography over alumina.

In the normal testosterone series (X is methylene) one member of the dihydroxyandrostene intermediae genus is known as a chemical compound prepared by an indirect route; namely, 3β-acetoxy-17β-hydroxy-17-ethylisopropylamino-androst-5-ene [Heusser et al. Helv. Chim. Acta. 33, 1093 (1950)].

Others are prepared as described above and in the examples.

The compounds of Formula I in the testosterone series in which R is amino, i.e., the primary amines, are known (for example, U.S. Pat. No. 3,102,126) but are prepared by means of the 17-cyano intermediate. Such methods do not lend themselves to tertiary amines. No sedative activity is reported in the literature for the primary amines. No pertinent art in the preferred B-nor series is known.

The compounds of this invention demonstrates central nervous system depressant activity without overt toxicity at oral doses within the range of from about 25–200 mg./kg. in mice. For example, in the standard dose range test in mice, 17α-N-piperidinomethyltestosterone exhibited depression at 200 mg. p.o. In the light box test in mice at 200 mg./kg. orally it reduced activity 72.9% over controls. In the light box test the 17α-N-piperidinomethyl-B-nortestosterone had an $ED_{50}$ of 49 mg./kg. p.o. In the standard rage suppression test in mice induced by foot shock 17α-N-piperidinomethyl-B-nor-testosterone gave an $ED_{50}$ of 63 mg./kg. The normal testosterone congener also decreased rage 66% over the control group of mice at 75 mg./kg. orally. The methiodide of the 17α-piperidinomethyltestosterone at 20 mg./kg. subcutaneously administered decreased serum cholesterol from 98 mg./100 ml. to 80 mg./100 ml., a significant amount, in rats over the castrate control group. The intermediate 17α-N-piperidinomethyl - 3β,17β-dihydroxy-B-norandrost-5-ene hydrochloride showed significant depression and Straub-tail in the light box test in mice at 50 and 100 mg./kg. p.o. These test results are indicative of central nervous system depressant activity of the new compounds, most meaningfully characterized as the general sedative type. The B-nor congeners of the claimed series are also seen from this data to be significantly more active than are those of the normal series.

The terms "lower alkoxide," "lower alkyl" or "lower acyl" are considered as a practical matter to be limited to a maximum of 6 carbon atoms for the purpose of illustrating this invention. The symbol "⁀" represents either β or α configuration. At the 17-position when one substituent is β, the other must necessarily be α. Also the lower acyl derivatives of certain of the compounds of this invention may be prepared. Such are made by forcing acylation of the 17β-hydroxy group such as by heating at reflux in acetic anhydride overnight. Also, the 17β-tertiary aminomethyl compounds of this invention may optionally be converted into an equivalent nontoxic acid addition salt with a phermaceutically acceptable organic or inorganic acid such as hydrochloric, sulfuric, phosphoric, sulfamic, ethanedisulfonic, maleic, succinic, etc. acids. Also the tertiary bases of this invention can be converted to nontoxic quaternary ammonium salts with pharmaceutically acceptable quaternizing agents such as lower alkyl halides, i.e., chlorides, bromides or iodides, lower alkyl sulfates, phenyl lower alkyl halides or sulfates, hydroxy or lower alkoxy substituted lower alkyl halides, etc. while retaining biological activity. Also other standard variations in the nucleus will be obvious to those skilled in the art such as 19-nor, 4-halo or hydroxy, $\Delta^{1,2}$ or other modifications. These are included in this invention.

The following examples are designed to illustrate this invention but not to be construed as limiting its scope.

EXAMPLE 1

A solution of 8 g. of 17β,20-epoxy-3β-hydroxy-21-nor-17-iso-B-norpregn-5-ene (Pat. No. 3,300,489) in 200 ml.

of methanol containing 80 ml. of distilled piperidine is maintained at room temperature for 72 hours. The reaction mixture is evaporated to a residue at reduced pressure. The residue is dissolved in 800 ml. of ether and treated with dry hydrogen chloride. The precipitated hydrochloride salt is collected by filtration and stirred with a mixture of 750 ml. of methylene chloride and 200 ml. of 5% ammonium hydroxide. The methylene chloride phase is separated, dried and evaporated to give 17α-N-piperidinomethyl-3β,17β-dihydroxy-B-norandrost - 5 - ene which melts at 83–84° C.

A solution of 5 g. of 17α-N-piperidinomethyl-3β,17β-dihydroxy-B-norandrost-5-ene in 500 ml. of toluene containing 56 ml. of distilled cyclohexanone and 6 g. of aluminum isopropoxide is slowly distilled during 3 hours so that the final volume of the reaction mixture is about 100 ml. The cooled reaction mixture is treated with 25 ml. of water and filtered. The filtrate is steam distilled until the distillate is clear and the cooled nonvolatile aqueous mixture is extracted with methylene chloride. Evaporation of the dried methylene chloride extracts yields 17α-N-piperidinomethyl-B-nortestosterone, M.P. 156–157° C. after recrystallization from acetone. The amine (500 mg.) is dissolved in ether and reacted with dry hydrogen chloride gas to separate the hydrochloride salt. Another portion (500 mg.) is heated at reflux with an excess of ethyl bromide in ethyl acetate to give the ethobromide.

Similarly, the mixture of the isomeric starting materials is treated as above to give additional amounts of the isomers described as well as 17β-N-piperidinomethyl-3β,17α-dihydroxy-B-norandrost-5-ene and 17β-N-piperidinomethyl-17α-hydroxy-B-norandrost-4-ene-3-one, M.P. 178–179° C. after recrystallization from acetone, the isomeric pairs being separated by chromatography over alumina.

EXAMPLE 2

A solution of 10.0 g. of 17β,20-epoxy-3β-hydroxy-21-nor-17-isopregn-5-ene in 250 ml. of methanol is treated with 100 ml. of freshly distilled piperidine and allowed to stand at room temperature for 72 hours. The solution is concentrated to a residue at reduced pressure to give crude 17α-N-piperidinomethyl-3β,17β - dihydroxyandrost-5-ene which melts at 152–154° C. after recrystallization from acetone-hexane and then from methanol-water.

The oxidation of 17α-N-piperidinomethyl-3β,17β-dihydroxyandrost-5-ene is carried out as described above to give 17α-N-piperidinomethyltestosterone which melts at 136–138° C. after recrystallization from acetonitrile.

A solution of 2.0 g. of 17α-N-piperidinomethyltestosterone in 50 ml. of acetonitrile and 15 ml. of methyl iodide is refluxed for 1.5 hours. The solution is concentrated and cooled and the crystals which separate are collected by filtration. After recrystallization from acetonitrile the purified 17α-N-piperidinomethyltestosterone methiodide melts at 233–235° C. Other tertiary amines are prepared similarly substituting molar equivalent quantities of the desired amine.

EXAMPLE 3

Aliquot portions of 2 g. of 17β,20-epoxy-3α-hydroxy-21-nor-17-iso-B-norpregn-5-ene in 50 ml. of methanol are reacted as described above in detail in turn with dimethylamine, diethylamine, dibutylamine, methylethylamine, pyrrolidine, thiomorpholine, morpholine and N-methylpiperazine respectively, then oxidized under Oppenauer conditions which cyclohexanone and aluminum isopropoxide to give 17α-dimethylaminomethyl-B-nortestosterone, 17α-diethylaminomethyl-B-nortestosterone, 17α-dibutylaminomethyl - B - nortestosterone, 17α-methylethylaminomethyl-B-nortestosterone, 17α - N-pyrrolidinomethyl-B-nortestosterone, 17α-N-thiomorpholinomethyl-B-nortestosterone, 17α-N-morpholinomethyl-B-nortestosterone and 17α-N-(N-methylpiperazino)methyl - B - nortestosterone.

Using 17β,20-epoxy-3β-hydroxy-21-nor-17-isopregn-5-ene, or other 17-isomers with secondary amines, other members of the tertiary series are similarly prepared.

What is claimed is:

1. A compound of the formula:

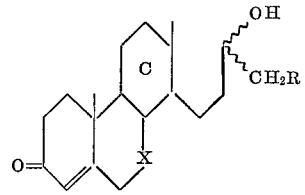

in which X is methylene or a single bond; and R is diloweralkylamino, N-piperidino, N-pyrrolidino, N-morpholino, N-thiomorpholino or N,N-loweralkylpiperazino.

2. The compound of claim 1 characterized in that X is a single bond.

3. The compound of claim 1 in which X is a single bond and R is N-piperidino said compound being 17α-N-piperidinomethyl-B-nortestosterone.

4. The compound of claim 3 in the form of its hydrochloride salt.

5. The compound of claim 1 in which X is methylene and R is N-piperidinomethyl said compound being 17α-N-piperidinomethyltestosterone.

6. The compound of claim 5 in the form of its methiodide salt.

7. A compound of the formula:

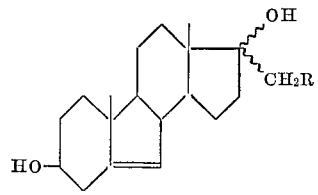

in which R is diloweralkyllamino, N-piperidino, N-pyrrolidino, N-morpholino, N-thiomorpholino or N,N-loweralkylpiperazino.

8. The compound of claim 7 in which R is N-piperidino said compound being 17α-N-piperidinomethyl-3β,17β-dihydroxy-B-norandrost-5-ene.

References Cited

UNITED STATES PATENTS 2,880,233 3/1959 Clinton.
3,102,126 8/1963 Crabbe.

HENRY A. FRENCH, Primary Examiner

U.S. Cl. X.R.

260—239.55, 397.4, 294.7, 247.73, 243, 268, 326.8, 999